United States Patent Office 2,892,472
Patented June 30, 1959

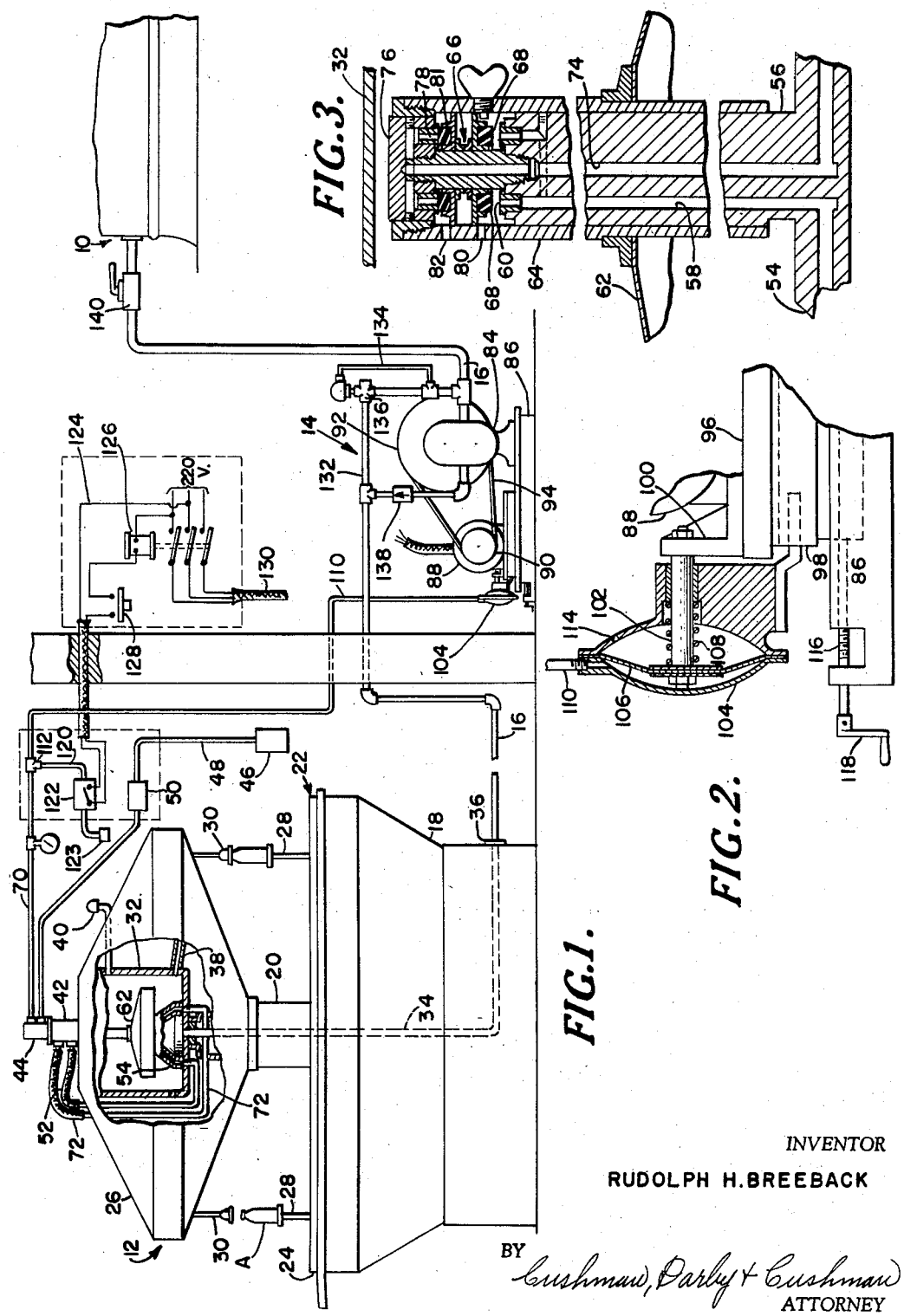

2,892,472

FILLING SYSTEM

Rudolph H. Breeback, Baltimore, Md., assignor to Crown Cork & Seal Company, Inc., Baltimore, Md., a corporation of New York Application October 8, 1956, Serial No. 614,501

20 Claims. (Cl. 141—6)

The present invention relates to a filling system and, more partciularly, to a system for continuously delivering carbonated liquids, such as beer, or the like, from a storage tank to a filling machine while the filling machine is filling containers.

Although the system of the present invention is described hereinafter as relating to the delivery of beer from Government tanks to filling machines in a brewery, it is within the scope of the present invention that other carbonated liquids, such as soft drinks, or the like, could be used with this system.

The system of the present invention basically requires a storage tank for the carbonated liquid and a filling machine with a reservoir therein for receiving the carbonated liquid from the storage tank for delivery to containers. The Government tanks used in breweries for brewing and aging beer are normally used as storage tanks for the filling machines, the beer in the Government tanks being transferred directly to the reservoir of the filling machines from which the beer is then flowed into containers. It is of course within the scope of the present invention that any tank which is used to supply the reservoir of a filling machine would be considered a storage tank, within the meaning of the appended claims.

Beer and other carbonated liquids must be handled gently throughout the filling operation, including the transfer from the storage tank to the filling machine. The entrained gases in a carbonated liquid have a tendency to escape when the liquid is unnecessarily agitated. The foaming resulting from release of gases from the carbonated liquid causes inaccurate filling of containers, as well as loss of flavor of the beverage. Heretofore, beer has been transferred from the Government tank to the reservoir of the filling machine by utilizing differential pressure between the beer in the Government tank and the gas superposing the beer in the reservoir or by pumping beer into the reservoir dependent upon the level of beer in the reservoir. Such prior systems have required that the flow of beer between the Government tank and the reservoir of the filling machine be frequently started and stopped during the course of a working day. In other words, in the case of the use of differential pressure, the beer flow between the storage tank and the reservoir of the filling machine is stopped many times while containers are being filled when the liquid level and pressure conditions in the reservoir are such that the level of liquid in the reservoir is high and there is no substantial pressure differential between the storage tank and the reservoir. On the other hand, when pumps are used to cause liquid flow, the pumps are continually stopping and starting, dependent upon the level of liquid in the reservoir. Such starting and stopping of the pumps results from an attempt to maintain the level of liquid in the reservoir at a predetermined height. The starting and stopping of the flow of beer causes surges and churning of the beer in the conduit between the storage tank and the reservoir and because beer is an unstable liquid, due to carbonation, foaming results when beer is flowed into the reservoir.

An object of the present invention is the provision of a filling system and method whereby beer is continuously flowed from a storage tank into the reservoir of a filling machine while containers are actually being filled, thereby eliminating surges and churning of the beer being flowed.

Another object of the present invention is the provision of a filling system and method wherein the beer is continuously flowed from a storage tank into the reservoir of the filling machine while the filling machine is in operation and filling containers, the flow of beer into the filling machine being stopped only when there is a substantial break in the feed of containers to the filling machine.

Still another object of the present invention is the provision of a filling system and method wherein the beer flow into a filling machine from a storage tank is continuous when the filling machine is filling containers, the continuous flow being varied in rate flow dependent upon level changes of the beer in the reservoir of the filling machine. By increasing the flow of beer to the reservoir when the level of beer therein is low and by decreasing the flow of beer into the reservoir when the level of beer therein is high, a continuous flow of beer can be maintained while containers are being filled during the course of a working day and stopping and starting of the flow is substantially eliminated.

A still further object of the present invention is to provide a system and method of supplying beer from a storage tank to a filling machine and then to a container, the efflux of beer from the filling machines to the container varying the level of beer in the filling machine reservoir, the level of beer in the filling machine reservoir continuously controlling the rate of flow of beer from the storage tank thereto.

These and other objects of the present invention will be more apparent from the following specification, claims and drawings, in which:

Figure 1 is a schematic view of the filling system of the present invention.

Figure 2 is an enlarged fragmentary view of the pump speed control or regulator, and Figure 3 is an enlarged fragmentary vertical sectional view of the float valve within the reservoir of the filling machine.

Referring specifically to the drawings, wherein like or similar characters or reference numerals represent like or similar parts, the system of the present invention comprises generally a Government or storage tank 10 and a filling machine generally indicated at 12. The storage tank 10 is usually one of a number of such tanks located in a brewery at a remote distance from the filling machine, where the beer is brewed and aged a sufficient period of time according to Government regulations. After beer has been aged a sufficient period of time, the storage tank 10 is connected to the filling machine 12 which drains the beer from the storage tank as it fills containers A. Since the filling machine 12 is usually located at a remote distance from the storage tank 10, a pump unit, generally indicated at 14, is provided in a pipe or conduit 16, extending between the storage tank 10 and the filling machine 12. The control and operation of the pump unit 14, associated with the filling of containers A by the filling machine 12 as beer is being transferred from the storage tank 10 to the filling machine, will be described in more detail later in the specification.

In Figure 1 of the drawings, the filling machine 12 is of the rotary type, now commonly used in breweries or soft drink plants for continuously filling containers successively fed thereto. Such a filling machine may be of the type disclosed in the patents to Robert J. Stewart and Wiltie J. Gladfelter Nos. 2,097,107 and 2,202,033 for Filling Machines, issued October 26, 1937, and May 28, 1940, respectively. In more detail, filling machine 12 generally includes a stationary base frame or table member 18, a vertical rotatable column 20, and a rotary structure 22 mounted on the column 20 for rotation therewith. Rotary structure 22 includes a rotating container supporting table 24 and an upper rotating turret 26. A plurality of vertically movable container supporting platforms 28 are provided adjacent the periphery of the container supporting table 24 while a plurality of filling heads 30 are carried by the upper rotating turret 26. Each of the filling heads 30 is in vertical alignment with one of the container supporting platforms 28. Upper rotating turret 26 also supports a beer reservoir 32 which receives beer from the storage tank 10 through a conduit or pipe 34 extending vertically upwardly through the column 20. Pipe 34, through suitable connections, is connected to the conduit 16, as indicated at 36.

Containers A are fed to the stationary table member 18 of the filling machine 12 by a conveyor such as shown in the aforementioned Stewart et al. Patent No. 2,202,033 and are transferred by an infeed dial onto platforms 28 when the platforms are carried past the infeed station by the rotating table 24. The containers A are successively positioned on the lowered platforms and the platforms are then raised so that the containers sealingly engage the filling heads 30 positioned above the platforms. The filling valves (not shown) of the filling heads 30 are then actuated to cause the containers to first be placed under counter-pressure gas and then to be filled with beer from the reservoir 32. Suitable conduits 38 extend from the reservoir to the filling heads 30 for the flow of liquid therefrom, whereas, other suitable conduits, such as disclosed in the aforementioned Stewart and Gladfelter patents extend from the upper portion of the reservoir to the filling heads for the supply of counter-pressure gas and the venting of the container during filling. After the containers A are filled with beer, they are lowered away from the filling head 30 by the platforms 28 and are then transferred from the rotating table 24 by suitable outfeed dials to a take-off conveyor, such as disclosed in the aforementioned Stewart et al. Patent No. 2,202,033. The take-off conveyor transfers the filled containers to any suitable container closing mechanism.

The reservoir 32 of rotary filling machine 12, which is positioned within the shell of the upper turret 26, is substantially airtight so that the beer stored therein may be placed under a superposed body of gas at a pressure higher than atmospheric pressure. Carbon dioxide gas or the like is usually used in the reservoir as it has an affinity for beer or other carbonated liquid. A pressure relief valve 40 provided on the reservoir 32 is set to relieve pressure of the superposed body of gas on the beer within the reservoir at any desired value.

Mounted centrally of the rotating turret 26 and adapted to rotate therewith is a collar 42. A stationary fitting 44 is disposed centrally of the collar and has passages therein communicating with passages in the rotating collar 42 for the purposes described later in the specification. A source of carbon dioxide gas, generally indicated at 46, is connected to the stationary fitting 44 by a line or conduit 48. A suitable pressure regulator 50 is provided in the line 48 so that the pressure of the carbon dioxide gas delivered to the space above the beer may be controlled. A line or conduit 52 extending from the rotating fitting 42 to a passage 58 in one leg of a tripod 54 communicates with the pipe line 48 so that carbon dioxide gas can be flowed into the upper portion of reservoir 32. The tripod 54 has a post 56 extending upwardly from its central portion and the passage 58 opens to the top surface of the post, as shown at 60 in Figure 3. A float 62 provided with a central collar 64 is vertically slidable on the post 56 in accordance with level changes of beer in the reservoir 32. A movable valve element 66 carried within the upper portion of the sleeve or collar 64 has a downwardly facing gasket 68 which is adapted to engage the upper end 60 of passage 58 to cut off the infeed of gas to the reservoir from the source 46 when the level of liquid is low.

A second conduit or pipe line 70 is connected to the stationary fitting 44 and is in communication with a conduit or pipe line 72 extending between the rotating fitting 42 and a passage 74 in another leg of tripod 54. The passage 74 extends vertically upwardly through the post 56 of tripod 54 and through a fitting 76 threaded into the post 56. Passage 74 opens downwardly, as indicated at 78. An upwardly facing gasket 81 also carried on the valve element 66 and movable with the float 62 is adapted to close the passage 74 at 78 when the level of beer within reservoir 32 has risen to a predetermined height. When float 62 is moved to such a position within reservoir 32 by the level of liquid therein that the valve 66 does not close either of the passages 58 or 74, the passage 58 is in communication with the interior of the reservoir through a suitable port 80 in sleeve 64, whereas, the passage 74 is in communication with the interior of the reservoir through a suitable port 82 in sleeve 64. Since the passage 74 is to be used to vent gas from the reservoir for the purposes described later in the specification, the port 82 is positioned above the port 80 so that the chances of the port 82 becoming clogged with foam is substantially eliminated.

Referring now to Figures 1 and 2, pump unit 14 includes a positive displacement variable speed pump 84 carried on a suitable stationary frame structure 86 and a 220 volt three-phase electric motor 88 movably mounted on the frame structure 86. The motor 88 is provided with a "Reeves" type drive pulley 90 which is adapted to drive a pulley 92 of pump 84. A suitable drive belt 94 is provided and when the motor is moved toward the pump, the "Reeves" pulley will cause the pump to operate at a faster speed although the motor speed remains substantially constant. As shown in Figure 2, the motor 88 is carried on a frame structure 96 which is slidably mounted on a frame structure or base 98. Base 98 is in turn slidably mounted on the previously mentioned stationary frame structure 86 which also carries the pump 84. An L-shaped bracket 100 attached to the frame structure 96 is connected rigidly to one end of a plunger 102 of a fluid pressure operated regulator 104. The other end of the plunger 102 is connected to a diaphragm 106 within the casing of the fluid pressure regulator 104. A spring 108 normally urges the diaphragm to the left of Figure 2 and, consequently, the base structure 96, with the motor 88, is moved to the left because the regulator is rigidly attached to the frame structure 98. The side of diaphragm 106, opposite the spring 108, is provided with a conduit 110 which is connected to the conduit 70 by a T-fitting 112. The spring side of diaphragm 106 is open to atmosphere by a suitable vent 114. Pressure in the line 70 working against the diaphragm tends to move the diaphragm and the motor mounting 96 toward the right of Figure 2 against spring 108.

A manual adjustment for the speed of pump 84 is provided by making the base structure 98 slidable in suitable keyways on the frame structure 86. A threaded screw 116 engaging a suitable threaded hole in the base structure 98 is adapted to be turned by a crank handle 118 whereby the position of the motor can be manually adjusted with respect to the pump 84 to thereby change its speed.

A pipe line 120 extends from the T-fitting 112 to a pressure-actuated switch 122. Pressure-actuated switch 122 is provided with a bleed 123 which constantly bleeds pressure from the switch 122 to atmosphere. Switch 122 is in the control circuit 124 of magnetic starter relay 126. A starter switch 128 also in the control circuit 124 is adapted to be closed and when this switch is closed and sufficient pressure in the line 120 closes the switch 122, the solenoid of relay 126 is energized, closing the circuit 130 to the motor and, thus, the motor is started. Both the control circuit 124 and the motor circuit 130 may utilize the same source of electric power (not shown) as indicated by the schematic drawing of Figure 1.

Pump 84 is provided with means to protect it when the pipe or conduit 16 on its outfeed side becomes clogged and excessive pressure develops therein. A bypass 132 extends from the outlet side of pump 84 back to its inlet side. Bypass 132 is provided with a sight gauge 134 and a pressure relief valve 136. When excessive pressure develops in the line 16 the pressure relief valve opens and permits beer to flow through the bypass 132 and recirculate through the pump. Sight gauge 134 gives the operator an indication that the system is mal-functioning. A one-way check valve 138 is provided on the outlet side of the pump so that there is no chance of the beer back-tracking through the pump when excessive pressures develop in the pipe line 16 on the outfeed side of the pump. The bypass 132 may be used to drain the system when the pump is not operating, by manually opening the pressure relief valve 136.

A hand-operated shut-off valve 140 is provided in the pipe line 16 adjacent the storage tank 10 so that when it is desired to clean the filling machine and the lines thereto, after a long period of operation, beer from the tank 10 can be shut off from the rest of the system.

The operation of the system is as follows: Pump 84 is manually adjusted by turning the hand-crank 118 and moving motor 88 with respect thereto so that the pump output is such as to raise the level of beer in reservoir 32 from a predetermined low limit to a predetermined high limit in a period of approximately two minutes. The level differential of beer in the reservoir 32 of the filling machine is such that the float 62 rises from the closed position of the passage 58 by the valve 66 to a position where the passage 74 is closed by the valve 66. Once the speed of the pump 84 has been determined for the static condition of raising the beer from the low to the high level in the reservoir 32 the system is then ready for complete automatic operation during filling of containers. Switch 128 is closed and the filling machine 12 is started. Containers A are continuously fed onto successive platforms 28 to be filled. With the pressure of the gas above the beer adjusted by the pressure regulator 50 and the pressure relief valve 40 to be in the order of fifteen pounds per square inch, and the beer level in the reservoir low, the carbon dioxide inlet through passage 58 is closed by the float valve 66. However, the passage 74 will be opened and gas escapes from reservoir 32 through the passage 74 to the pipe line 72 and the pipe 70, where it is directed to the fluid pressure regulator 104 and to the fluid pressure actuated switch 122. The switch 122 closes, energizing the solenoid of magnetic relay 126, thereby energizing the circuit to start motor 88. The gasket 81 of valve 66 is at a position farthest away from the opening 78 of passage 74 and, therefore, gas at a maximum amount of pressure is vented from reservoir 32 to the passage 74 and conduits 72, 70 and 110. The diaphragm 106 of regulator 104 is moved to the right of Figure 3 to its farthest position and the pressure necessary to move it to this position is approximately twelve pounds, there being a line loss of approximately three pounds in the lines between the diaphragm and the reservoir. Movement of the diaphragm to the right moves the motor to the right and consequently the pump 84 is operating at high speed, whereby beer is flowing rapidly into the reservoir 32.

As the float 62 rises in the reservoir 32, the distance between the gasket 81 and the openings 78 of passage 74 are decreased, thereby restricting the flow of gas being vented from the interior of the reservoir to the lines 70 and 110. This causes the pressure in the lines 70 and 100 to drop off, whereby the spring 102 in the regulator 104 overcomes the diaphragm and moves the motor to the left of Figure 2. The pump slows down so that the beer flow to the reservoir decreases thereby normally preventing the level of beer in the reservoir from rising to a level where the opening 78 of passage 74 is closed. If opening 78 is closed by gasket 81 of valve 66, the pressure acting on switch 122 bleeds completely off the switch, allowing the switch to open and stop the motor circuit. The fluid pressure operated regulator 104 modulates the speed of operation of the pump 84 so that the pump is continuously running while containers are being filled. In other words, the speed of the pump 84 is constantly varying with the varying of the level of the liquid in the reservoir 32. As the level of liquid builds up in the reservoir 32 the pump slows down and the efflux of beer to the containers eventually becomes greater than the influx of beer into the reservoir. The level then drops and the float 62 also drops, opening up the ports 78 whereby the diaphragm is actuated to cause the pump to speed up so that the influx of beer to the reservoir 32 is greater than the efflux of beer to the containers. The constant modulation of the speed of the pump, whereby the pump is not stopped while containers are being filled, allows the flow of liquid through the conduit 16 to the reservoir to be continuous, thereby eliminating surges from the conduit.

The pump 84 operates continuously so long as there is a flow of containers to the filling machine. As pointed out above, the output of the pump continuously varies in accordance with the level of liquid in the reservoir 32 thereby eliminating surges in the conduit 16 caused by starting and stopping of the pump. However, when the supply of containers to the filling machine 12 is completely interrupted for any considerable length of time, the pump is stopped because the float 62 in reservoir 32 rises with the level of liquid to a point where it causes closing of the ports 78, thereby cutting off venting of gas from the reservoir. The pressure in line 70 drops and the pressure acting on the switch 122 is permitted to bleed off whereby the switch opens, breaking the circuit to the relay 126. Deenergization of relay 126 stops the motor 88.

The terminology used in this specification is for the purpose of description and not limitation, the scope of the invention being defined in the claims.

I claim:

1. In a filling system for successively filling containers with a carbonated liquid, a storage tank for a source of supply of carbonated liquid, a filling machine for receiving and filling containers successively fed thereto, said filling machine including a reservoir for a body of the carbonated liquid and a superposed body of gas, and means connected to said reservoir for filling the containers, fluid connecting means between said storage tank and the reservoir of said filling machine for transferring carbonated liquid from said storage tank to the reservoir of said filling machine, liquid transfer means in said fluid connecting means for continuously causing flow of the carbonated liquid from said storage tank to the reservoir of said filling machine when the level of liquid is below a predetermined level in said reservoir and containers are being successively filled by the same, and means continuously operable in response to changes of the level of liquid in said reservoir when below said predetermined level to cause said liquid transfer means to increase and decrease the rate of flow of liquid into said reservoir.

2. A filling system of the character described in claim 1, including means operable when the level of liquid in said reservoir has reached a predetermined level higher than said first mentioned predetermined level to cause said liquid transfer means to discontinue flow of liquid through said fluid connecting means.

3. In a filling system for successively filling containers with a carbonated liquid, a storage tank for a source of supply of carbonated liquid, a filling machine for receiving and filling containers successively fed thereto, said filling machine including a reservoir for a body of the carbonated liquid and a superposed body of gas and means connected to said reservoir for filling the containers, said reservoir having a level of liquid which varies depending upon efflux of the liquid therefrom to the containers when the same are being successively filled, fluid connecting means between said storage tank and the reservoir of said filling machine for transferring carbonated liquid from said storage tank to the reservoir of said filling machine, and liquid transfer means in said fluid connecting means for continuously flowing liquid from said storage tank to said reservoir, and means to vary rate of continuous flow of liquid by said liquid transfer means in accordance with the variance of level of liquid in said reservoir below a predetermined level.

4. In a filling system for successively filling containers with carbonated liquid, a storage tank for a source of supply of carbonated liquid, a filling machine for receiving and filling containers successively fed thereto, said filling machine including a reservoir for a body of the carbonated liquid and a superposed body of gas and means connected to said reservoir for filling the containers, fluid connecting means between said storage tank and the reservoir of said filling machine for transferring carbonated liquid from the storage tank to the reservoir of said filling machine, a variable speed pump in said fluid connecting means operated to continuously cause flow of the carbonated liquid from the storage tank to the reservoir of said filling machine when containers are being successively filled and the level of liquid in said reservoir is below said predetermined level, means to continuously control the speed of said pump in accordance with the level of liquid in the reservoir of said filling machine when the level of liquid is below said predetermined level, said last mentioned means increasing the speed of said pump when the level of liquid in said reservoir is decreasing and decreasing the speed of said pump when the level of liquid in said reservoir is increasing toward said predetermined level.

5. A filling system of the character described in claim 4, wherein said last mentioned means is operated by fluid pressure of the superposed body of gas in the reservoir of said filling machine.

6. In a filling system for successively filling containers with a carbonated liquid, a storage tank for a source of supply of carbonated liquid, a filling machine for receiving and filling containers successively fed thereto, said filling machine including a reservoir for a body of the carbonated liquid and a superposed body of gas and means connected to said reservoir for filling the containers, fluid connecting means between said storage tank and the reservoir of said filling machine for transferring carbonated liquid from said storage tank to the reservoir of said filling machine, a variable speed pump in said fluid connecting means operated continuously when below a predetermined level to cause flow of the carbonated liquid from the storage tank to the reservoir of said filling machine when containers are being filled, means to cause the speed of said pump to continuously vary upon fluctuation of level of liquid in said reservoir when below said predetermined level, said last mentioned means including a fluid pressure operated control means for said pump and a float-operated valve in said reservoir for supplying varying fluid pressures to said control means dependent upon the level of liquid in said reservoir.

7. A method of supplying carbonated liquid from a storage tank to the reservoir of a filling machine and then to containers being filled, comprising maintaining a gas above the liquid in the reservoir of the filling machine at a pressure within predetermined limits, filling containers with the carbonated liquid from the reservoir of the filling machine, continuously flowing carbonated liquid from the storage tank to the reservoir of the filling machine while containers are being filled, and varying the rate of flow of carbonated liquid while maintaining the continuous flow of the same from the storage tank to the reservoir in accordance with the varying of the level of liquid in the reservoir of the filling machine.

8. A method of supplying carbonated liquid from a storage tank to the reservoir of a filling machine and then to containers being filled, comprising maintaining a gas above the liquid in the reservoir of the filling machine at a pressure within predetermined limits, filling containers with carbonated liquid from the reservoir of the filling machine, utilizing a pump to transfer carbonated liquid from the storage tank to the reservoir, continuously operating the pump while containers are being filled whereby carbonated liquid is continuously flowed into the reservoir, and varying the speed of continuous operation of the pump dependent upon the variance of the level of liquid in the reservoir thereby increasing the rate of flow of carbonated liquid to the reservoir when the level of liquid in the reservoir is decreasing and decreasing the flow of carbonated liquid to the reservoir when the level of the carbonated liquid in the reservoir is increasing.

9. A method of the character described in claim 8, including stopping the flow of carbonated liquid to the reservoir when the level of carbonated liquid in the reservoir has reached a predetermined height.

10. A method of the character described in claim 8, including utilizing the pressure of gas above the liquid in the reservoir for controlling the speed of operation of the pump.

11. A method of supplying carbonated liquid from a storage tank to the reservoir of a filling machine and then to containers being filled, comprising maintaining a gas above the liquid in the reservoir at a pressure within predetermined limits, filling containers with carbonated liquid from the reservoir of the filling machine, maintaining the level of carbonated liquid in the reservoir between predetermined high and low limits, utilizing a pump to transfer carbonated liquid from the storage tank to the reservoir, continuously operating the pump while containers are being filled whereby carbonated liquid is continuously flowed into the reservoir, varying the speed of continuous operation of the pump depending upon the level of liquid in the reservoir between the high and low limits to thereby increase rate of flow of carbonated liquid to the reservoir when the level of liquid approaches the low limit and decrease the rate of flow of carbonated liquid to the reservoir when the level of liquid in the reservoir approaches the high limit, and utilizing the pressure of the gas above the liquid in the reservoir when there is a change in level of liquid therein to control the speed of operation of the pump.

12. A method of the character described in claim 11, including stopping the flow of carbonated liquid to the reservoir when the level of liquid in the reservoir has reached the high limit, and utilizing the pressure of the gas above the liquid in the reservoir to control the stopping of the pump when the level of liquid in the reservoir has reached the high limit.

13. A method of supplying carbonated liquid from a storage tank to the reservoir of a filling machine and then to containers being filled, comprising maintaining a gas above the liquid in the reservoir of the filling machine at a pressure within predetermined limits, utilizing a pump to transfer carbonated liquid from the storage tank to the reservoir, adjusting speed of operation of the pump to transfer liquid from the storage tank to the reservoir of the filling machine whereby the reservoir is filled from a predetermined low level limit to a predetermined high livel limit in approximately two minutes, then filling containers with the carbonated liquid from the reservoir of the filling machine, and modulating the adjustment of the pump so as to continuously flow liquid at varying rates of flow between the low and high level limits of liquid in the reservoir of the filling machine as containers are being filled.

14. A method of the character described in claim 13, including utilizing carbonated liquid level changes in the reservoir to cause modulation of the pump whereby speed of operation of the pump is increased when the level of carbonated liquid in the reservoir approaches the low level limit and is decreased as the level of carbonated liquid in the reservoir approaches the high level limit.

15. A method of the character described in claim 14, including stopping the flow of carbonated liquid to the reservoir when the efflux of carbonated liquid from the reservoir to the containers is such as to cause the level of carbonated liquid in the reservoir to reach the predetermined high level limit.

16. In a filling system for successively filling containers with a carbonated liquid, a storage tank for a source of supply of carbonated liquid, a filling machine for receiving and filling containers successively fed thereto, said filling machine including a reservoir for a body of carbonated liquid and a superposed body of gas, and means connected to said reservoir for filling the containers, fluid connecting means between said storage tank and the reservoir of said filling machine for transferring carbonated liquid from said storage tank to the reservoir of said filling machine, a variable speed pump in said fluid connecting means for causing flow of carbonated liquid from the storage tank to the reservoir of said filling machine, means to adjust the speed of said pump whereby the reservoir of said filling machine is capable of being filled between low and high limits in a predetermined time, and means independent of said last-mentioned means for continuously varying the speed of said pump between the high and low level limits of the liquid in said reservoir when containers are being filled, so that the carbonated liquid is continuously flowed into the reservoir during filling at varying rates of flow.

17. In a filling system for successively filling containers with a carbonated liquid, a storage tank for a source of supply of a carbonated liquid, a filling machine for receiving and filling containers successively fed thereto, said filling machine including a reservoir for a body of the carbonated liquid and a superposed body of gas and means connected to said reservoir for filling the containers, fluid connecting means between said storage tank and the reservoir of said filling machine for transferring the carbonated liquid from said storage tank to the reservoir of said filling machine, a variable speed pump in said fluid connecting means for varying the rate of flow into said reservoir, an electric motor unit to drive said pump, pulley drive means connecting said pump to said motor, said pulley drive means being capable of varying the speed of said pump dependent upon the position of the motor with respect to said pump, a fluid pressure-operated regulator including means operatively connected to said pump and said motor to vary the distance therebetween and thus control the speed of said pump and the rate of flow of liquid into said reservoir, a float-operated valve on said filling machine responsive to the level of liquid in the reservoir, fluid connecting means connecting said float-operated valve to said pressure regulator, said pressure regulator being operated by the pressure of the gas above the liquid in said reservoir as controlled in said last-mentioned fluid connecting means by said float-operated valve.

18. A filling system of the character described in claim 17, wherein said means operatively connecting said pressure regulator to said pump and motor includes a diaphragm, one side of the diaphragm being open to atmosphere and the other side of the diaphragm being open to said last-mentioned fluid connecting means.

19. A filling system of the character described in claim 18, including manual means to adjust the relative position of said pump with said motor.

20. A filling system of the character described in claim 17, including means responsive to the high level limit of the liquid in said reservoir to stop said pump.

References Cited in the file of this patent

UNITED STATES PATENTS

| 2,660,360 | Gricar et al. | Nov. 24, 1953 |
| 2,781,178 | Brown | Feb. 12, 1957 |